United States Patent Office 3,249,394
Patented May 3, 1966

---

3,249,394
VAT DYEING WITH THIOSULFATE DYES
Max Staeuble, Kurt Weber, and Istvan Hari, Basel, Switzerland, assignors to Ciba Limited, Basel, Switzerland, a Swiss company
No Drawing. Filed Dec. 1, 1961, Ser. No. 156,541
Claims priority, application Switzerland, Dec. 6, 1960, 13,642/60; Oct. 3, 1961, 11,473/61
7 Claims. (Cl. 8—34)

This invention is based on the observation that textile materials, especially textile materials of cellulose, can be colored, i.e., dyed or printed in a very advantageous manner by using vat dyestuffs which contain as the sole sulfur substituent at least one thiosulfuric acid semi-ester group bound to an alkyl chain and, before or during the dyeing or printing process reducing the dyestuff to the leuco form and oxidizing the leuco-compound on the fiber in the usual manner.

As thiosulfuric acid semi-ester groups there are to be understood so-called thiosulfate groups of the formula

—S—SO$_3$X in which X represents a cation.

The above characteristic grouping present in the vat dyestuffs used in the process of the invention may be bound directly to an aromatic nucleus of the vat dyestuff. However, it is especially advantageous to use vat dyestuffs which contain the thiosulfuric acid semi-ester group in an external nucleus of the dyestuff molecule, that is to say in an aromatic nucleus which is bound to the vattable system through a bridge, for example, through an —O—, —CO—, —NH—, —S—, —SO$_2$—NH— or

—CO—NH— bridge, or contains the semi-ester group in an aliphatic chain. The latter may be, for example, an alkylene chain which is bound to the dyestuff molecule directly or through an —O—, —S—, amino, —CO—NH—, —SO$_2$—, —SO$_2$NH— bridge or a heterocyclic bridge, for example, through a triazinylamino bridge or through a cyamelurylamino bridge or through a pyrimidinylamino bridge. The aforesaid aliphatic chain may be interrupted by a hetero atom, more especially an oxygen, sulfur or nitrogen atom.

The term "vat dyestuffs" is used herein to include dyestuffs which are converted by reduction into a so-called leuco form or vat which has a better affinity for natural or regenerated cellulose fibers than does the non-reduced form, and which can be reconverted by oxidation into the original chromophore system. In addition to at least one thiosulfuric acid semi-ester group, the dyestuffs may contain substituents that are usually present in vat dyestuffs, for example, halogen atoms or alkoxy, acylamino or alkyl groups. In certain cases the presence of hydrophilic groups, especially sulfonic acid groups or sulfato groups, and the presence of reactive groups, may be of advantage.

In the process of the invention the dyestuff is reduced to the leuco form, before or during the dyeing or printing process, and the leuco-compound is oxidized on the fiber in the usual manner.

The dyeing or printing process is carried out in the presence of an alkali, especially an alkali metal hydroxide, and a reducing agent.

As reducing agents there are used more especially strong reducing agents such as sodium hydrosulfite, thiourea dioxide or hydroxyalkane sulfuric acids, such as Rongal A. The proportion of the reducing agent may vary within wide limits. In general it suffices with the water-soluble dyestuffs to use a considerably smaller proportion of reducing agent than is required for dyeing with vat dyestuffs by the known processes. Dyeing may be carried out, for example, by the exhaustion method. In this case the material to be dyed is treated in a solution of the dyestuff which contains the alkali and the reducing agent, advantageously at a moderately raised temperature, more especially within the range of 20° C. to 90° C. The reoxidation of the leuco-compound and the after-treatment, such as rinsing and soaping at the boil, are carried out by the methods usual in dyeing with vat dyestuffs.

In an especially advantageous form of the process an aqueous solution of the vat dyestuff is applied by padding to the cellulose textile material. For this purpose the goods to be dyed are impregnated with the dyestuff solution, advantageously in the cold or at a moderately raised temperature, and squeezed in the usual manner. The impregnated material is advantageously squeezed to such an extent that it retains 50 to 140% of its weight of dyestuff solution. The treatment with the alkali and a reducing agent is carried out after the impregnation, and advantageously after drying the impregnated material. For this purpose the pretreated material is impregnated with an aqueous solution containing the alkali and the reducing agent, then squeezed, and the dyestuff is fixed on the material by steaming. The after-treatment, namely rinsing with cold water, oxidation, if desired in the presence of an oxidizing agent, for example, hydrogen peroxide or sodium perborate, acidification and soaping at the boil, is carried out in the usual manner.

Instead of applying the dyestuff to the material by impregnation it may be applied by printing. In this case there is used a printing color, which contains the dyestuff and the additions usual in printing with vat dyestuffs, such as potassium carbonate, hydrosulfite or Rongalite and a thickening agent.

By the process of this invention there are produced on textile materials, especially textile materials of cellulose, excellent dyeings and prints which are generally also fast to dry cleaning and migration. The dyed fabrics can therefore be coated with synthetic resins, for example, polyvinyl chloride, without the dyestuff migrating into the synthetic resin, which is especially important in the manufacture of artificial leather.

By the process of this invention there are obtained strong and usually very level dyeings which possess excellent properties of fastness, for example, a good fastness to chlorine and light, and also a good fastness to boiling soda. As compared with the conventional vat dyeing methods, the process of the invention has the great advantage that it uses vat dyestuffs that are applied in a water-soluble form and can therefore be much more easily vatted. Processes are known which use dyestuffs containing the aforesaid thiosulfate groups, but they are used with weak reducing agents which merely bring about splitting off of the thiosulfuric acid residue and do not cause reduction of the chromophore system of the vat dyestuff into its leuco-form which is most advantageous for dyeing. The dyeings produced by these known processes are therefore considerably weaker and are useless in practice.

The following examples illustrate the invention, the parts and percentages being by weight unless otherwise stated, and the relationship of parts by weight to parts by volume being the same as that of the kilogram to the liter:

Example 1

6.6 parts of the dyestuff of the formula

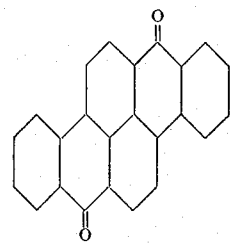

are dissolved in 80 parts of chlorosulfonic acid and heated for 12 hours at 100 to 105° C., while stirring. The solution is then cautiously poured on to ice, the precipitated sulfochloride is filtered off with suction, and the filter residue is washed with ice water and condensed with β-aminoethyl-thiosulfuric acid while continuously neutralizing the mineral acid liberated during the condensation. 6 parts by volume of sodium hydroxide solution of 30% strength are consumed.

0.1 part of the vat dyestuff so obtained having the formula

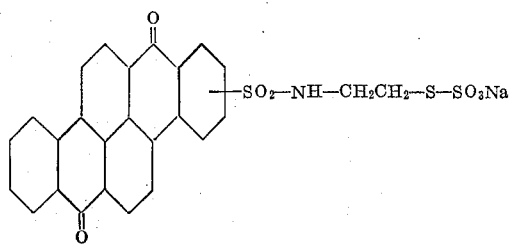

is dissolved in 50 parts of water at 60° C. The solution is poured into a warm mixture, having a temperature of 60° C., of 2 parts by volume of sodium hydroxide solution of 30% strength and 1.2 parts of sodium hydrosulfite in 350 parts of water, 10 parts of cotton are then immediately entered, and dyeing is carried on for 45 minutes at 60° C. in the presence of 8 parts of sodium chloride. After the dyeing operation, the material is oxidized, washed, acidified, again rinsed well, and soaped at the boil. There is obtained a strong yellow dyeing having good properties of fastness.

Example 2

0.75 part of the dyestuff of the formula

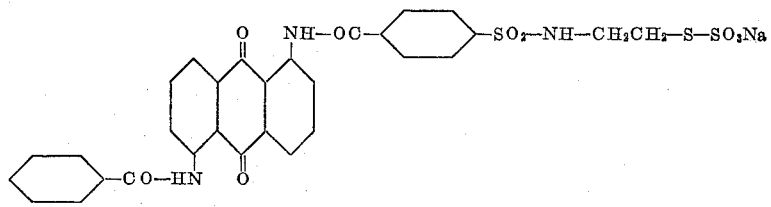

are pasted in 250 parts of warm water. The dyestuff suspension so obtained is introduced into a solution, having a temperature of 50° C., of 10 parts by volume of sodium hydroxide solution of 30% strength and 6 parts of sodium hydrosulfite in 1750 parts of water, whereupon vatting takes place instantaneously. 50 parts of cotton are dyed in the dyebath so obtained for 45 minutes at 50 to 60° C. in the presence of 60 parts of sodium chloride. After the dyeing operation, the material is oxidized, washed, acidified, rinsed well, and soaped at the boil. There is obtained a yellow dyeing having good properties of fastness.

A red dyeing having similar properties is obtained by using in this example the dyestuff of the formula

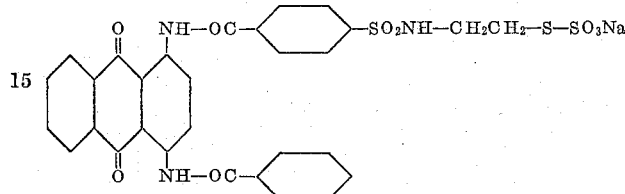

The dyestuffs used in this example can be obtained from the corresponding sulfochlorides of the formulae

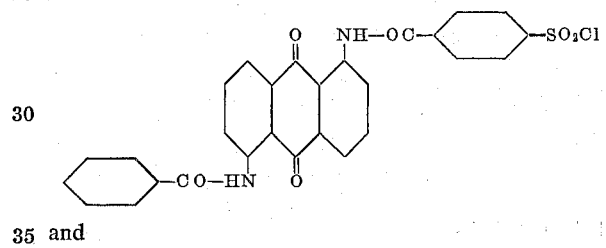

and

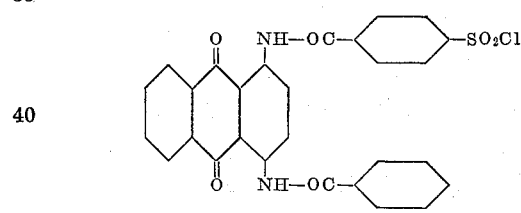

by reacting them in finely divided aqueous suspension with β-aminoethylthiosulfuric acid at 10 to 40° C. and a pH-value of 8 to 9.

By using, instead of β-aminoethyl-thiosulfuric acid, β-N-methylamino-ethyl-thiosulfuric acid or γ-aminopropyl-thiosulfuric acid or the thiosulfuric acid derivative of the formula

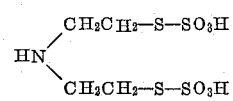

there are obtained dyestuffs which produce similar dyeings by the dyeing method described in this example.

Example 3.—Pad-jig process

A cotton fabric is padded at room temperature (about 25° C.) to a weight increase of 80% with a solution containing in 1000 parts of water 10 parts of the dyestuff of the formula

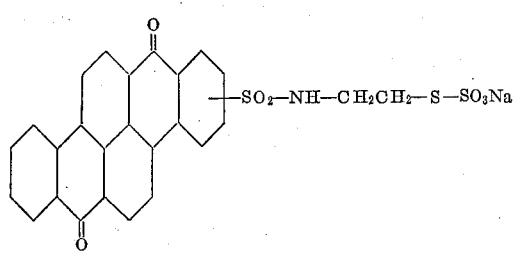

The dyeing is then developed by treating the material in a bath which contains in 1000 parts of water 100 parts of sodium chloride, 20 parts by volume of a sodium hydroxide solution of 40% strength and 10 parts of sodium hydrosulfite. After the dyeing operation, the material is oxidized, rinsed, acidified, rinsed well and soaped. There is obtained a yellow dyeing.

A satisfactory dyeing is also obtained by using thiourea dioxide instead of sodium hydrosulfite.

*Example 4.—Pad-steam method*

A cotton fabric is padded at 25° C. to a weight increase of 80% with a solution containing in 1000 parts of water 10 parts of the dyestuff of the formula given in Example 3. The fabric, with or without being dried, is impregnated in a bath containing in 1000 parts of water, 200 parts of sodium chloride, 50 parts by volume of sodium hydroxide solution of 40% strength, and 30 parts of sodium hydrosulfite. The material is then squeezed to a weight increase of 70 to 100%. The material is then steamed for 50 seconds and finished in the manner described in Example 3.

A somewhat better result is obtained by steaming for 120 seconds.

*Example 5.—Pad roll method*

A cotton fabric is impregnated at 25° C. with a padding solution which contains in 1000 parts of water, 10 parts of the dyestuff of the formula given in Example 3, 50 parts by volume of sodium hydroxide solution of 40% strength and 40 parts of Rongalite. The material is then squeezed to a weight increase of 80%. After being squeezed the material is heated in an infrared zone or a steam channel to 80° to 85° C., introduced into a chamber heated to the aforesaid temperature, and advantageously free from air, and the material is kept for 2 to 4 hours in a rolled-up condition. The material is finished in the manner described in Example 3.

*Example 6.—Single bath steaming process*

A cotton fabric is impregnated at 25° C. with a padding solution which contains in 1000 parts of water 12 parts of the dyestuff used in Example 3, 50 parts of urea, 50 parts by volume of a sodium hydroxide solution of 40% strength and 40 parts of Rongalite. Then, with or without being dried, the material is steamed for 5 minutes and the dyeing is completed in the manner described in Example 3.

*Example 7.—Thermofixation process*

A cotton fabric is impregnated at 25° C. with a padding solution which contains in 1000 parts of water 10 parts of the dyestuff used in Example 3, 200 parts of urea, 20 parts of potassium carbonate, 2 parts by volume of sodium hydroxide solution of 40% strength and 80 parts of Rongalite. With or without being dried, the material is then heated for 5 minutes at 150° C. and the dyeing is finished in the manner described in Example 3.

*Example 8.—Printing*

A printing color having the following composition is prepared:
20 parts of the dyestuff of the formula

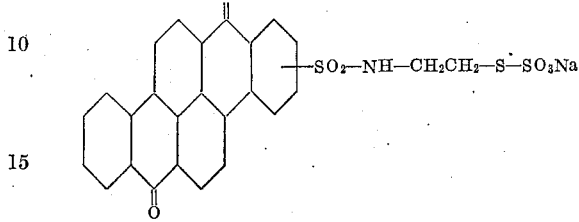

200 parts of urea,
238 parts of water,
400 parts of sodium alginate thickening, 50/1000,
60 parts of potassium carbonate solution (1:2),
2 parts of sodium hydroxide solution of 40% strength,
80 parts of Rongalite 1000 parts The printing color is applied to a cotton fabric by means of a roller printing machine, then the fabric is dried, and steamed for 8 minutes at 100° C. in a Mather-Platt apparatus. The finishing treatment is carried out as described in Example 3.

A similar, good result is obtained on staple fibers of regenerated cellulose.

What is claimed is:

1. Process for coloring textile materials, which comprises applying a vat dyestuff which contains as the sole sulphur substituent at least one thiosulfuric acid semi-ester group bound to an alkyl chain, reducing the dyestuff to the leuco form at any stage of the process and then oxidizing the leuco-compound on the fiber.

2. A process as claimed in claim 1, wherein the textile material is a textile material of cellulose.

3. A process as claimed in claim 1, wherein a vat dyestuff is applied which contains at least one and not more than four radicals of the formula

—S—SO₃H

4. A process for dyeing cellulose textile materials, which comprises padding the textile material to be dyed with an aqueous solution of the dyestuff and treating the padded material with an aqueous solution containing an alkali and a member selected from the group consisting of an alkali metal hydrosulfite and thiourea dioxide, and the dyestuff used is a vat dyestuff which contains as the sole sulfur substituent at least one and not more than four radicals of the formula —S—SO₃H bound to alkyl chains 5. A process for printing cellulose textile materials, which comprises applying a printing paste which contains a vat dyestuff having 1–4 thiosulfuric acid semi-ester groups bound to alkyl chains as the sole sulfur substituent, an alkaline thickening agent and an alkaline reducing agent selected from the group consisting of an alkali metal hydrosulfite and thiourea dioxide.

6. A process according to claim 4, wherein there is applied an anthroquinone vat dyestuff containing 1–4 thiotulfato-alkylamide groups.

7. A process according to claim 4, wherein there is applied a vat dyestuff containing a sulfonic acid-ethylamide group bearing a thiosulfuric acid semi-ester group in β-position of the ethylamide substituent.

(References on following page)

References Cited by the Examiner

UNITED STATES PATENTS

| | | | |
|---|---|---|---|
| 2,180,805 | 11/1939 | Felix | 9—39 |
| 2,245,971 | 6/1941 | Felix | 8—41 |
| 2,283,326 | 5/1942 | Felix | 8—41 |
| 2,670,265 | 2/1954 | Heyna. | |
| 2,743,267 | 4/1956 | Heyna | 8—1.2 |
| 3,000,762 | 9/1961 | Tesoro. | |
| 3,022,304 | 2/1962 | Staeuble | 8—54.2 |
| 3,088,790 | 5/1963 | Schultheis | 8—1.213 |
| 3,097,908 | 7/1963 | Jellinek | 8—1.213 |

OTHER REFERENCES

Diserens, The Chemical Technology of Dyeing and Printing, pages 33, 39, 164–168, pub. 1948 by Reinhold Pub. Corp., New York City.

Journal of the Society of Dyers and Colourists, June 1963, page 276.

NORMAN G. TORCHIN, *Primary Examiner.*

MORRIS O. WOLK, *Examiner.*

D. LEVY, *Assistant Examiner.*